March 26, 1968        A. M. BIGGAR        3,375,136
LAMINATED THIN FILM FLEXIBLE ALKALINE BATTERY
Filed May 24, 1965
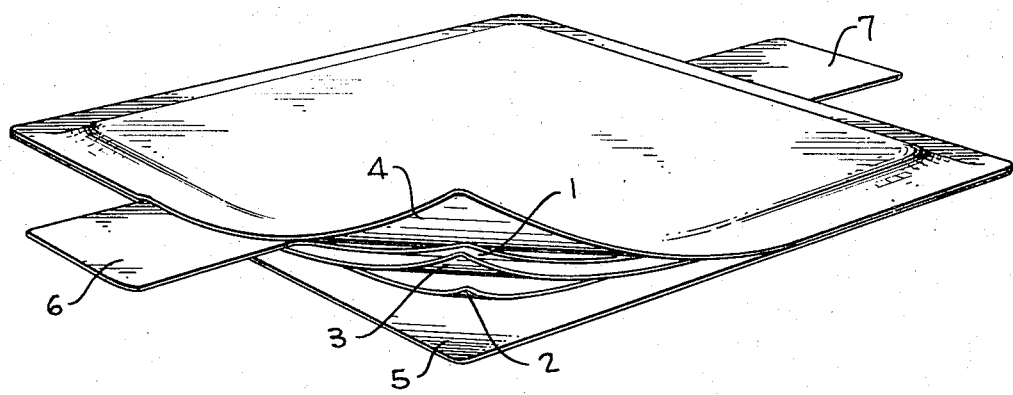
INVENTOR.
ALLAN M. BIGGAR

3,375,136
LAMINATED THIN FILM FLEXIBLE ALKALINE BATTERY

Allan M. Biggar, Arlington, Va., assignor to the United States of America as represented by the Secretary of the Army
Filed May 24, 1965, Ser. No. 458,522
8 Claims. (Cl. 136—6)

The invention described herein may be manufactured and used by or for the Government of the United States of America for governmental purposes without the payment to me of any royalty thereon.

This invention relates to batteries and more particularly to thin film flexible batteries.

The accurate forecasting of weather on a global scale is of great interest to all the military forces and to many of the civilian agencies of the U.S. Government. As part of the program for improving weather forecasting techniques, a study is underway to utilize high-altitude, free-floating, constant-level balloons equipped with suitable electronic devices to map upper atmosphere wind patterns and better detect those changes in the upper atmosphere that precede weather changes at ground level. The balloons used in this project will remain aloft for about a month and fly at altitudes where some of them may possibly be struck by jet aircraft. Many balloons will be aloft at a given time. The hazard to aircraft is not considered to be serious so long as only the balloon itself is present. However, any massive body such as a block of electronic equipment or even a small dense metal or plastic object or a conventional battery could result in catastrophic damage to the aircraft in the event of a collision. Thus, concentrated mass is not acceptable from a safety standpoint.

Flight conditions of the weather balloon impose rather severe requirements on the power supply for this system. Power must be delivered during both day and night throughout a period of at least a month. Temperatures of —65° F. and occasionally lower are expected during the night. During the day, temperatures would normally range around 0° F. but can climb above 200° F. in the case of a dark-covered surface exposed to direct solar radiation. Total weight of the battery is a relatively important consideration, since the balloon cost is greatly influenced by the load to be lifted. Freedom from mass concentration is, of course, an essential consideration. Atmospheric pressures at the flight altitude are very low, so that gassing or moisture loss from the battery can lead to difficulties.

It is therefore an object of the present invention to provide a lightweight battery having a low concentration of mass.

It is another object of this invention to provide a thin film flexible battery which is capable of operating at very low temperatures and pressures.

It is a further object of the invention to provide a flexible thin film battery which can be used as a power source for high altitude weather balloons.

According to the present invention, the foregoing and other objects are attained by providing a thin film flexible battery comprising a positive nickel-oxide electrode, a negative cadmium electrode, a potassium-hydroxide electrolyte, a two-ply separator, and two encapsulating films. The total assembled thickness of this battery is typically on the order of 0.007 inch.

The specific nature of the invention, as well as other objects, aspects, uses and advantages thereof, will clearly appear from the following description and from the accompanying drawing, in which:

The sole figure is a perspective view illustrating the laminated structure of a thin film flexible battery according to the instant invention.

Excessively large areas of a primary battery material would be required to power the electronic equipment in a balloon for one month. Therefore, a storage battery that may be recharged is required. Daily recharging is possible through the use of relatively inexpensive solar cells. Charging would take place only when the battery is exposed to the warming effects of direct solar radiation, thus avoiding problems connected with the charging at extremely low temperature.

Since low temperatures will be encountered during much of the daily cycle, only systems which operate well at low temperatures can be considered. The present invention is an electrochemical system having an aqueous alkaline solution electrolyte and electrodes which do not significantly alter the composition of this electrolyte during charge or discharge. The specific electrolyte is a 31 percent aqueous solution of potassium hydroxide which constitutes a eutectic mixture with a freezing point slightly lower than —80° F. Other alkaline electrolytes, for example, cesium and rubidium hydroxides could be employed at even lower temperatures. Potassium hydroxide is, however, adequate for the purpose and has the advantages of ready availability and low cost. This solution has excellent electrical conductivity even at low temperatures. With one mil electrode spacing, an area of one square inch of this electrolyte has a resistance of 0.025 ohm at its freezing point.

Several factors limit the choice of active material for the negative electrode. As mentioned previously, reaction products should not significantly alter the composition of the electrolyte during charge or discharge. The negative electrode must react in a completely reversible manner and must not displace hydrogen from the potassium hydroxide solution. It should have as high a negative potential in the potassium hydroxide solution as other considerations will permit. Finally, it must be capable of being formed into thin films for use in battery construction. Cadmium and possibly iron satisfy these requirements.

Similarly, several factors limit the choice of the active material for the positive electrode. In this case it is necessary that the material not displace oxygen from the potassium hydroxide solution and that it not migrate to the negative electrode in such a way as to cause hydrogen evolution at the negative electrode or short circuits due to "treeing." The oxidation-reduction reaction at the positive electrode must also be completely reversible. It should leave the electrolyte essentially unchanged and should permit as high a positive potential as possible. Further, the positive electrode should be capable of being embodied in a thin film with good mechanical properties. The oxides of silver, nickel, copper, and mercury are materials which will satisfy these requirements.

Physical construction of the two electrodes presents some problems. A foil or solid sheet of oxidized electrode material is likely to be extremely brittle. To overcome this problem, a metallized fabric substrate is used. Thin nylon marquisette can be metallized either by vacuum deposition or chemical reduction techniques. This metallized fabric remains conductive after serve flexing and it can be employed satisfactorily in plating and battery-type operations. However, bonded fiber non-woven net materials ensure better electrical continuity in metallized fabrics than does woven cloth. A bonded Dynel felt .8 mil thick has been used as the electrode substrate. This fabric is readily available commercially, is inexpensive, and has a high degree of porosity and flexibility. Further, it exhibits a satisfactory degree of resistance to chemicals and to tearing.

The first step in preparing electrodes is to render the fabric conductive. This is done by vacuum deposition of various metals and by painting the fabric with a conductive paint. However, it has been found that satisfactory conductive fabrics can be prepared most simply and inexpensively by a process in which the object is treated successively in stannous chloride, water, palladium chloride, and a mixture of copper salt in a reducing compound. This results in a copper-coated fabric.

The negative plate material is obtained by electro-depositing cadmium directly onto the copper-coated fabric. The presence of copper is not objectionable since the hydrogen overvoltage of copper is so high that it does not lead to evolution of gas when in contact with cadmium in potassium hydroxide solution. Palladium has a low hydrogen overvoltage. However, any palladium present is sealed off from the electrolyte by a dual coating of copper and cadmium.

The negative electrode material may be formed by first electro-depositing nickel on the copper-coated fabric, dipping the nickel-plated fabric in a saturated solution of nickel nitrate and then holding the fabric and the positive electrode in an electrolyzing bath of 25 percent sodium hydroxide for several minutes at about five amp per foot square. After careful washing, this process is repeated until a uniform black coating of nickel oxide is formed. Processing this material in this manner requires a great deal of labor. A better method, which places an extremely finely divided nickel in intimate contact with the copper-coated fabric so that a large metal surface could be oxidized to form the electrode, requires the co-deposition of nickel and zinc on the metallized fabric. The alloy-plated fabric is subsequently subjected to electrolysis in an alkali solution to simultaneously remove the zinc and oxidize the nickel component of the alloy plating.

Using the above procedure for fabricating the positive electrode, favorable results have been obtained, although the capacity was not at first as large as desired. It has been discovered that charging for a few minutes at a considerably higher current density than normally would be employed in charging a battery tends to "form" the electrode which thereafter is capable of storing and delivering several times more energy than before. Unfortunately, this forming process often causes damage to the conductive coating on the cloth with resulting open circuits in the positive electrode material. To overcome this problem, the nickel-zinc alloy is electro-deposited on a sheet of the cadmium-coated negative electrode material. A positive electrode material prepared in this manner has very good storage properties and remains free from open circuits after hours of intensive charging and recharging. This material is relatively simple to prepare and seems to offer all the qualities desired in a positive electrode material for the intended application. The freshly prepared cadmium-coated electrode material is very flexible and is an excellent electrical conductor. Even though it does not normally develop open circuits during use, it does exhibit a slight increase in resistance in the oxidized state and tends to become somewhat brittle. These undesirable characteristics have been overcome by painting the cadmium-coated fabric used for both the positive and the negative electrodes with an alkali resistant flexible resin in a lattice of thin lines about a quarter of an inch width at relatively wide spacings of perhaps about one and a half inches center to the center. The cadmium and copper under this lattice are unchanged in subsequent operations and ensure good electrical contact to all parts of the sheet, even after oxidation and severe flexing.

Referring now to the drawing, the battery assembly is illustrated as comprising the negative electrode 1 and the positive electrode 2 separated by thin, two-ply sheet 3 of porous flexible insulating material. The composite cell is wetted with the potassium hydroxide electrolyte solution. This assembly is vacuum packed between two impervious walls of thin flexible plastic sheet material 4 and 5. The envelope material 4 and 5 is preferably a one mil thick fluoro-carbon film having its surface treated to render it bondable on both sides. The fluoro-carbon film is highly resistant to strong alkali solution and remains flexible even at liquid nitrogen temperatures. Further, it has a very low moisture and carbon dioxide transmission and is inexpensive. Satisfactory alkali-resistant seals can readily be attained with this material either with or without intervening fabric leads, as, for example, lead 6 for the negative electrode 1 and lead 7 for the positive electrode 2. This is attained by using epoxy resin adhesive containing a flexiblizing agent such as polysulphide rubber, polyamide resins, or other suitable modifiers.

The positive plate material 2 is a very dense black color in the charged plate, and the negative plate material, which is originally of a silvery color, rapidly becomes dark gray in use. This means that the battery assembly must be protected from solar radiation if destructive overheating is to be avoided. Bonded metal reflecting foils on the outside surfaces of the battery envelope lead to unwanted stiffness and thickness and the danger of electrical shorts. Similarly, reflective white paint also leads to unwanted thickness and stiffness. Ordinary forms of metallic paints must also be quite thick to be really opaque. A suitable reflective coating may be applied to the outside surfaces of the envelope of the battery by first painting a dilute solvent solution of epoxy resin having a polyamide resin coreactant on the fluoro-carbon film. The solvent is allowed to evaporate and the resin partially cured until tacky. Aluminum flake, which is the commercial aluminum paint pigment, is next sprinkled on the resin-coated surface and the excess aluminum brushed off with a clean, dry brush. The resin is then fully cured by short exposure to an elevated temperature, and the finished surface is finally buffed to a high polish with a cotton pad. Several coats of this finish may be applied if so desired to attain maximum hiding power. Completely opaque surfaces can readily be obtained with only two coats with a total thickness of only two-tenths of a mil. In these thicknesses it remains adherent and flexible, even at liquid nitrogen temperatures. The surface has no measurable electrical conductivity at low voltages and hence introduces no shorting problem. The aluminum surface is highly reflective to most wave lengths of light and thus provides the desired protection from the sun. It also serves to further improve the excellent moisture and carbon dioxide transmission resistance of the fluoro-carbon film. Finally, the composite coating is simple and inexpensive to apply and does not add significantly to the thickness, stiffness, or weight of the battery envelope.

It will be apparent that the embodiment shown is only exemplary and that various modifications can be made in construction and arrangement within the scope of the invention as defined in the appended claims.

I claim as my invention:

1. A thin film flexible battery capable of operating at low temperatures and pressures comprising:
   (a) a negative electrode of a thin, flexible, cadmium-plated, copper-coated, felted fabric;
   (b) a positive electrode of a thin, flexible, nickel oxide coated, cadmium-plated, copper-coated, felted fabric;
   (c) a thin, flexible, porous, insulating spacer separating said negative electrode and said positive electrode;
   (d) an aqueous alkaline solution electrolyte wetting the assembly of said negative electrode, said positive electrode and said spacer; and
   (e) a vacuum sealed envelope of a thin, flexible, impervious plastic enclosing said assembly.

2. A thin film flexible battery as recited in claim 1 wherein said electrolyte is potassium hydroxide.

3. A thin film flexible battery as recited in claim 1 wherein said electrolyte is cesium hydroxide.

4. A thin film flexible battery as recited in claim 1 wherein said electrolyte is rubidium hydroxide.

5. A thin film flexible battery as recited in claim 1 wherein said envelope is a thin fluoro-carbon film having surfaces treated to render it bondable on both sides, said fluoro-carbon film being bonded with an epoxy resin adhesive containing a flexibilizing agent.

6. A thin film flexible battery as recited in claim 1 wherein the felted fabrics in said negative electrode and said positive electrode are bonded Dynel felts.

7. A thin film flexible battery as recited in claim 1 further comprising an opaque reflecting film bonded to the outside surfaces of said envelope.

8. A thin film flexible battery as recited in claim 7 wherein said opaque reflecting film is a thin film of epoxy resin to which is bonded aluminum flake.

References Cited
UNITED STATES PATENTS

| | | | |
|---|---|---|---|
| 2,662,928 | 12/1953 | Brennan | 136—24 |
| 2,666,802 | 1/1954 | Woodring et al. | 136—111 |
| 2,751,427 | 6/1956 | Woodring | 136—111 |

ALLEN B. CURTIS, *Primary Examiner.*

A. SKAPARS, *Assistant Examiner.*